(12) United States Patent
Zhu

(10) Patent No.: US 11,326,920 B2
(45) Date of Patent: May 10, 2022

(54) CORIOLIS MASS FLOW METER COMPRISING TWO MEASURING TUBE PAIRS, AND METHOD FOR THE ZERO-POINT ADJUSTMENT OF SUCH A MASS FLOW METER

(71) Applicant: Endress+Hauser Flowtec AG, Reinach (CH)

(72) Inventor: Hao Zhu, Freising (DE)

(73) Assignee: ENDRESS+HAUSER FLOWTEC AG, Reinach (CH)

(*) Notice: Subject to any disclaimer, the term of this patent is extended or adjusted under 35 U.S.C. 154(b) by 228 days.

(21) Appl. No.: 16/759,097

(22) PCT Filed: Oct. 2, 2018

(86) PCT No.: PCT/EP2018/076797
§ 371 (c)(1),
(2) Date: Apr. 24, 2020

(87) PCT Pub. No.: WO2019/081169
PCT Pub. Date: May 2, 2019

(65) Prior Publication Data
US 2020/0319007 A1    Oct. 8, 2020

(30) Foreign Application Priority Data
Oct. 27, 2017   (DE) .................... 10 2017 125 271.1

(51) Int. Cl.
*G01F 1/84* (2006.01)

(52) U.S. Cl.
CPC .......... *G01F 1/8436* (2013.01); *G01F 1/8422* (2013.01); *G01F 1/8427* (2013.01); *G01F 1/8431* (2013.01); *G01F 1/8477* (2013.01)

(58) Field of Classification Search
None
See application file for complete search history.

(56) References Cited

U.S. PATENT DOCUMENTS

| 6,311,136 B1 | 10/2001 | Henry et al. |
| 2006/0016273 A1* | 1/2006 | Bitto ...................... G01F 1/8413 73/861.355 |

(Continued)

FOREIGN PATENT DOCUMENTS

| CN | 100501346 C | 6/2009 |
| CN | 101501457 A | 8/2009 |

(Continued)

*Primary Examiner* — Harshad R Patel
(74) *Attorney, Agent, or Firm* — Christopher R. Powers; Endress+Hauser(USA) Holding, Inc.

(57) ABSTRACT

The present disclosure relates to a Coriolis mass flow meter including two measuring tube pairs each having two measuring tubes mounted as to oscillate relative to one another and have a bending vibration excitation mode of different excitation mode natural frequencies, each pair having an electrodynamic exciter and a vibration sensor pair including a first inlet-side vibration sensor and a first outlet-side vibration sensor, and further includes a circuit configured to determine phase difference-dependent mass flow measurement values, wherein a difference deviation between a first relative signal amplitude difference of sensor signals having the first excitation mode natural frequency and a second relative signal amplitude difference of sensor signals having the second excitation mode natural frequency is not more than a tolerance value.

18 Claims, 5 Drawing Sheets

(56) References Cited

U.S. PATENT DOCUMENTS

2009/0072173 A1    3/2009  Hasunuma et al.
2020/0278231 A1*  9/2020  Zhu .................... G01F 25/0007

FOREIGN PATENT DOCUMENTS

| CN | 101819056 A | 9/2010 |
| CN | 103528634 A | 1/2014 |
| CN | 105115575 A | 12/2015 |
| DE | 102014118367 A1 | 6/2016 |
| DE | 102015104931 A1 | 6/2016 |
| JP | 57137818 A | 8/1982 |
| JP | 2003177049 A | 6/2003 |

* cited by examiner

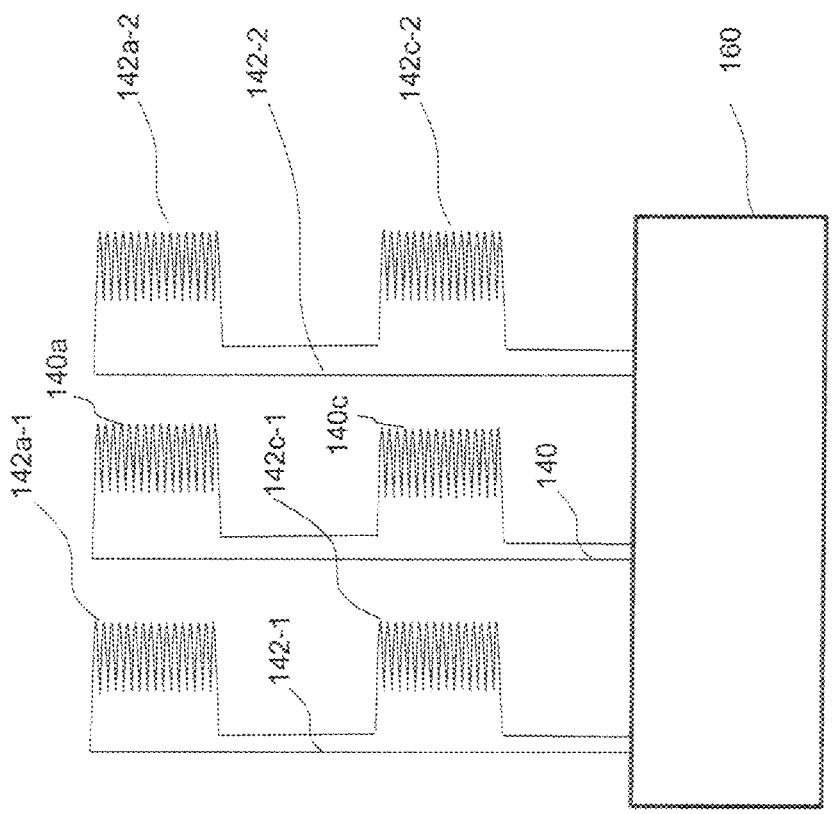

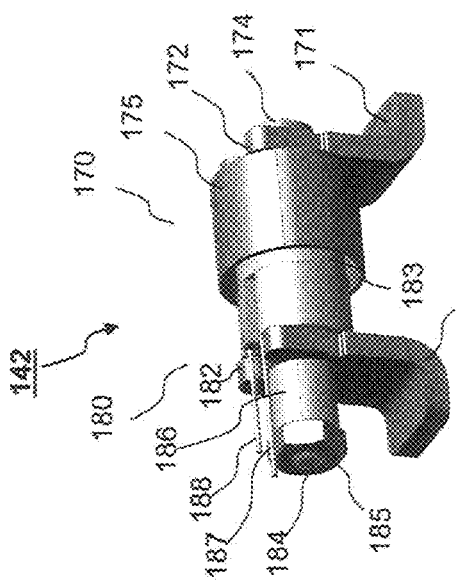
FIG. 3b
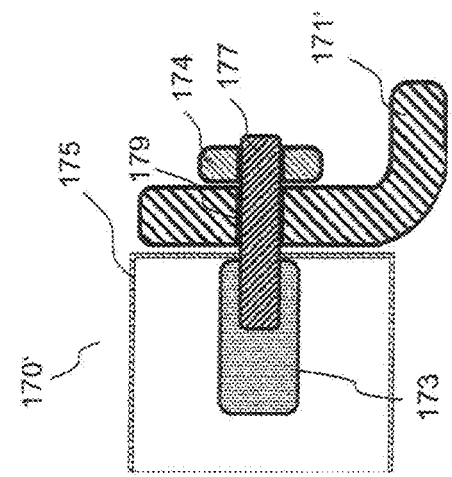
FIG. 3e
FIG. 3d
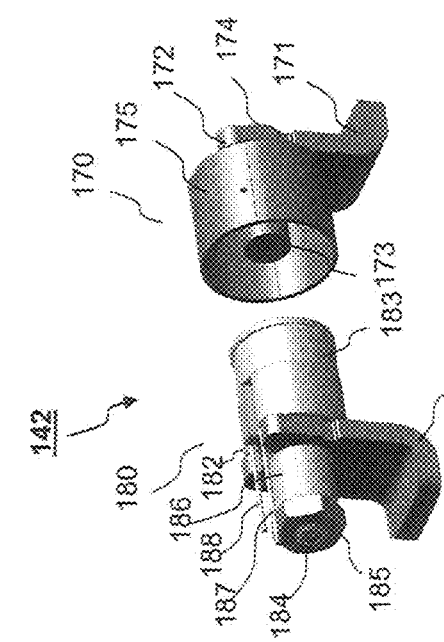
FIG. 3a
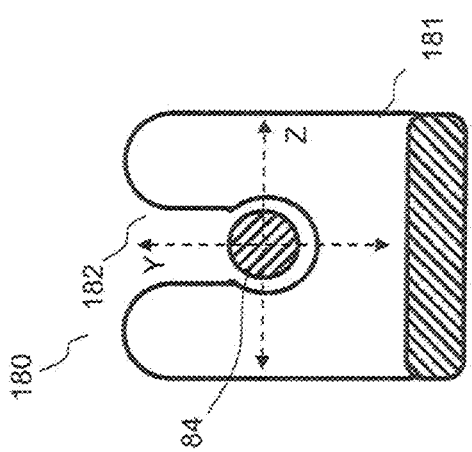
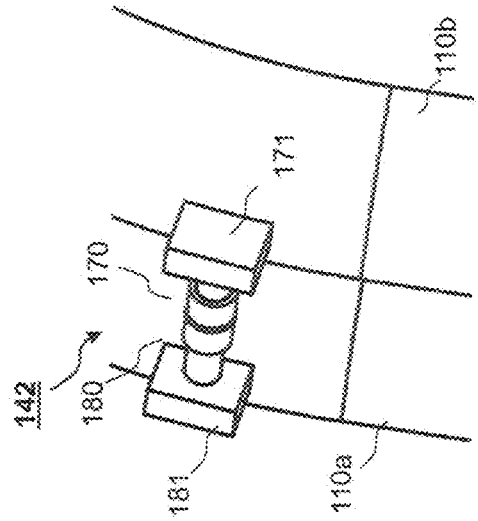
FIG. 3c

CORIOLIS MASS FLOW METER COMPRISING TWO MEASURING TUBE PAIRS, AND METHOD FOR THE ZERO-POINT ADJUSTMENT OF SUCH A MASS FLOW METER

CROSS-REFERENCE TO RELATED APPLICATIONS

The present application is related to and claims the priority benefit of German Patent Application No. 10 2017 125 271.1, filed on Oct. 27, 2017, and International Patent Application No. PCT/EP2018/076797, filed on Oct. 2, 2018, the entire contents of which are incorporated herein by reference.

TECHNICAL FIELD

The present invention relates to a mass flow meter according to the Coriolis principle having at least two measuring tube pairs, wherein the two measuring tube pairs have excitation mode natural frequencies different from one another for a respective bending vibration excitation mode.

BACKGROUND

A generic mass flow meter is described in DE 10 2015 104 931 A1. The different excitation mode natural frequencies are advantageous in order to minimize crosstalk between the vibrations of the measuring tube pairs.

The measuring tube pairs each have an electrodynamic exciter for exciting bending vibrations and two vibration sensors for detecting the bending vibrations, wherein the vibration sensors of a measuring tube pair are arranged in each case on the inlet side and on the outlet side. In principle, each measuring tube pair can be equipped with its own independent operation and evaluation circuit for driving the exciter and for detecting sensor signals, which, however, considerably increases the circuit complexity compared with a conventional mass flow meter with only one measuring tube pair. It is therefore desirable to provide only one operation and evaluation circuit which drives the exciters of both measuring tube pairs via a common exciter loop and detects the signals of the inlet-side vibration sensors of both measuring tube pairs and the signals of the outlet-side vibration sensors of both measuring tube pairs via an inlet-side and outlet-side sensor loop respectively.

In this case, a zero-point error may occur due to the different natural frequencies in combination with manufacturing tolerances, as will be explained below.

In mass flow meters according to the Coriolis principle, a phase shift proportional to flow between the signals of an inlet-side vibration sensor and an outlet-side vibration sensor is detected. For this purpose, in particular the phase difference of the respective maxima of the signals is detected when passing through the rest position.

Manufacturing tolerances can lead to the inlet-side and outlet-side vibration sensors being of different sensitivities and thus having different signal amplitudes with the same vibration behavior. In the case of a mass flow meter with only one measuring tube pair, this is injurious to the extent that the signals do not undergo a phase change due to amplitude variations. This changes when the sensor signals of two measuring tube pairs with different natural frequencies are superimposed. The bending vibration excitation mode of a measuring tube pair is excited at its excitation mode natural frequency. This leads to a maximum amplitude and a phase angle of $\pi/2$ between the exciter signal and the deflection. Since, in the above-described configuration, the exciters of both measuring tube pairs are driven via a common exciter loop, each measuring tube pair is also excited at the natural frequency of the bending vibration excitation mode of the respective other measuring tube pair with its different excitation mode natural frequency. This leads to a superimposed vibration out of resonance which has a considerably lower amplitude and a phase angle of 0 or $\pi$ between the exciter signal and the deflection. The superimposed vibration of a measuring tube pair at the excitation mode natural frequency of the other measuring tube pair therefore has a phase shift of $\pm\pi/2$ relative to its vibration in resonance. Since the signals of the vibration sensors of both measuring tube pairs are detected via common sensor loops, at the excitation mode natural frequency of a measuring tube pair, the signals of the vibration sensors of such resonantly vibrating measuring tube pair are superimposed on the signals of the vibration sensors of the forced vibrations of the other measuring tube pair, wherein the latter are shifted by $\pm\pi/2$ relative to the former.

The superposition of sensor signals of two measuring tube pairs with different amplitude ratios, between inlet-side and outlet-side sensors, can therefore result in a phase difference between the signals which cause a zero-point error of the mass flow meter.

Therefore, the object of the present invention is, to find a remedy.

SUMMARY

The object is achieved by the mass flow meter according to the present disclosure and the method for adjusting the zero point of a mass flow meter according to the present disclosure.

The mass flow meter according to the invention according to the Coriolis principle for determining a mass flow measurement value of a medium flowing through the mass flow meter comprises:

A first measuring tube pair having two measuring tubes which are mounted so as to be capable of oscillating relative to one another and have a bending vibration excitation mode which has a first media-dependent excitation mode natural frequency $f1$;

A first electrodynamic exciter for exciting bending vibrations between the measuring tubes of the first measuring tube pair, A first vibration sensor pair having a first inlet-side vibration sensor and a first outlet-side vibration sensor for detecting bending vibrations at two positions of the first measuring tube pair;

A second measuring tube pair having two measuring tubes which are mounted so as to be capable of oscillating relative to one another and have a bending vibration excitation mode which has a second media-dependent excitation mode natural frequency $f2$, A second electrodynamic exciter for exciting bending vibrations between the measuring tubes of the second measuring tube pair;

A second vibration sensor pair having a second inlet-side vibration sensor and a second outlet-side vibration sensor for detecting bending vibrations at two positions of the second measuring tube pair;

An operation and evaluation circuit; for driving the first and second electrodynamic exciters with a common exciter signal and for detecting signals of the vibration sensors; for determining flow-dependent phase differences between the signals of the inlet-side and outlet-side vibration sensors of one of the vibration sensor pairs and for determining mass flow measurement values on the basis of such flow-dependent phase differences;

Wherein the exciter signal is used to excite the bending vibration excitation modes of both measuring tube pairs;

Wherein an exciter signal path is designed to transmit the exciter signal to the first and second electrodynamic exciter;

Wherein an inlet-side sensor signal path is designed to transmit signals of the first and the second inlet-side vibration sensor in a superimposed manner;

Wherein an outlet-side sensor signal path is designed to transmit signals of the first and the second outlet-side vibration sensor in a superimposed manner;

Wherein the sensor signals have a first relative signal amplitude difference $delta_1$ between the signals of the inlet-side sensors and the signals of the outlet-side sensors in the case of vibrations with the first excitation mode natural frequency f1, Wherein the sensor signals have a second relative signal amplitude difference $delta_2$ between the signals of the inlet-side sensors and the signals of the outlet-side sensors in the case of vibrations with the second excitation mode natural frequency f2, Wherein the amount of the difference deviation $D=|delta_1-delta_2|$ of the second relative signal amplitude difference from the first relative signal amplitude difference $delta_1$ is not more than a tolerance value $D_T$, i.e. $D \leq D_T$, wherein $D_T<2\%$, in particular $D_T<1\%$, applies.

In a development of the invention, the relative signal amplitude difference $delta_i$ between the signal amplitudes of the vibration sensors of the $i^{th}$ measuring tube pair in the case of vibrations with its excitation mode natural frequency fi is defined as:

$$delta_i = \frac{2 \cdot (A_{in,i} - A_{out,i})}{A_{in,i} + A_{out,i}}.$$

Here, $A_{in,i}$ and $A_{out,i}$ are the inlet-side and outlet-side signal amplitudes at the excitation mode natural frequency fi.

In a development of the invention, the tolerance value of the difference deviation $D_T$ is not more than 0.5%, for example not more than 0.2%, in particular not more than 0.1%.

In a development of the invention, the absolute amount of the difference deviation divided by the sum of the absolute amounts of the relative signal amplitude difference is not more than 0.5, for example not more than 0.3, in particular not more than 0.2.

The method according to the invention serves the purpose of the zero-point adjustment of a mass flow meter according to the Coriolis principle for determining a mass flow measurement value of a medium flowing through the mass flow meter, which flow meter comprises:

A first measuring tube pair having two measuring tubes which are mounted so as to be capable of oscillating relative to one another and have a bending vibration excitation mode which has a first media-dependent excitation mode natural frequency f1;

A first electrodynamic exciter for exciting bending vibrations between the measuring tubes of the first measuring tube pair, A first vibration sensor pair having a first inlet-side vibration sensor and a first outlet-side vibration sensor for detecting bending vibrations at two positions of the first measuring tube pair;

A second measuring tube pair having two measuring tubes which are mounted so as to be capable of oscillating relative to one another and have a bending vibration excitation mode which has a second media-dependent excitation mode natural frequency f2, A second electrodynamic exciter for exciting bending vibrations between the measuring tubes of the second measuring tube pair;

A second vibration sensor pair having a second inlet-side vibration sensor and a second outlet-side vibration sensor for detecting bending vibrations at two positions of the second measuring tube pair;

An operation and evaluation circuit; for driving the first and second electrodynamic exciters with a common exciter signal and for detecting signals of the vibration sensors; for determining flow-dependent phase differences between the signals of the inlet-side and outlet-side vibration sensors of one of the vibration sensor pairs and for determining mass flow measurement values on the basis of such flow-dependent phase differences;

Wherein the exciter signal is used to excite the bending vibration excitation modes of both measuring tube pairs;

Wherein an exciter signal path is designed to transmit the exciter signal to the first and second electrodynamic exciter;

Wherein an inlet-side sensor signal path is designed to transmit signals of the first and the second inlet-side vibration sensor in a superimposed manner;

Wherein an outlet-side sensor signal path is designed to transmit signals of the first and the second outlet-side vibration sensor in a superimposed manner;

Wherein the method comprises the following steps:

Determining sensor signal amplitudes of the inlet-side vibration sensors when the measuring tubes vibrate with the first excitation mode natural frequency f1;

Determining sensor signal amplitudes of the outlet-side vibration sensors when the measuring tubes vibrate with the first excitation mode natural frequency f1;

Determining sensor signal amplitudes of the inlet-side vibration sensors when the measuring tubes vibrate with the second excitation mode natural frequency f2;

Determining sensor signal amplitudes of the outlet-side vibration sensors when the measuring tubes vibrate with the second excitation mode natural frequency f2;

Determining a first signal amplitude difference $delta_1$ between the signals of the inlet-side vibration sensors and the signals of the outlet-side vibration sensors when the measuring tubes vibrate with the first excitation mode natural frequency, Determining a second signal amplitude difference $delta_2$ between the signals of the inlet-side vibration sensors and the signals of the outlet-side vibration sensors when the measuring tubes vibrate with the second excitation mode natural frequency, Comparing the first signal amplitude difference with the second signal amplitude difference; and Adjusting the signal amplitude differences by trimming the sensitivity of at least one vibration sensor, such that the amount of a difference deviation between the first signal amplitude difference and the second signal amplitude difference is not more than a tolerance value $D_T=1\%$, wherein $D_T<1\%$ applies.

In a development of the invention, the tolerance value of the difference deviation $D_T$ is not more than 0.5%, for example not more than 0.2%, in particular not more than 0.1%.

In a development of the invention, the amount of the difference deviation divided by the sum of the amounts of the signal amplitude difference is not more than 0.5, for example not more than 0.3, in particular not more than 0.2.

In a development of the invention, the sensitivity of the at least one vibration sensor is trimmed by varying a relative position between a magnet and a coil of the vibration sensor.

In a development of the invention, the sensitivity of the at least one vibration sensor is trimmed by varying a rest position distance between a magnet and a coil of the at least one vibration sensor.

In a development of the invention, the sensitivity of the at least one vibration sensor is trimmed by varying a degree of coaxial alignment between a magnet and a coil of the at least one vibration sensor.

In a development of the invention, the sensitivity of the at least one vibration sensor is trimmed by varying the position of the vibration sensor in the direction of the longitudinal axis of the measuring tube.

In a development of the invention, the sensitivity of the at least one vibration sensor is trimmed by varying the position of the vibration sensor perpendicular to the direction of the longitudinal axis of the measuring tube.

In a development of the invention, the sensitivity of the at least one vibration sensor is trimmed by varying the effective number of windings of the coil of the vibration sensor.

In a development of the invention, the signal amplitude differences are adjusted by trimming the sensitivity of precisely one vibration sensor.

The invention is now described in further detail on the basis of an exemplary embodiment shown in the drawings. The following are shown:

BRIEF DESCRIPTION OF THE DRAWINGS

FIG. 1e shows a schematic of an exciter conductor loop, an inlet-side sensor conductor loop and an outlet-side sensor conductor loop connected to an operation and evaluation circuit according to the present disclosure;

FIG. 3a shows a spatial depiction of separated components of a vibration sensor of an exemplary embodiment of a mass flow meter according to the present disclosure;

FIG. 3b shows a spatial depiction of the components of a vibration sensor from FIG. 3a in an operationally ready position relative to one another;

FIG. 3c shows a schematic spatial depiction of the arrangement of components of a vibration sensor on a measuring tube pair of an exemplary embodiment of a mass flow meter according to the present disclosure;

FIG. 3d shows a schematic depiction of a coil holder of the vibration sensor from FIGS. 3a and 3b;

FIG. 3e shows a schematic depiction of a modified magnet holder of the vibration sensor from FIGS. 3a and 3b.

DETAILED DESCRIPTION

Figure 1B:
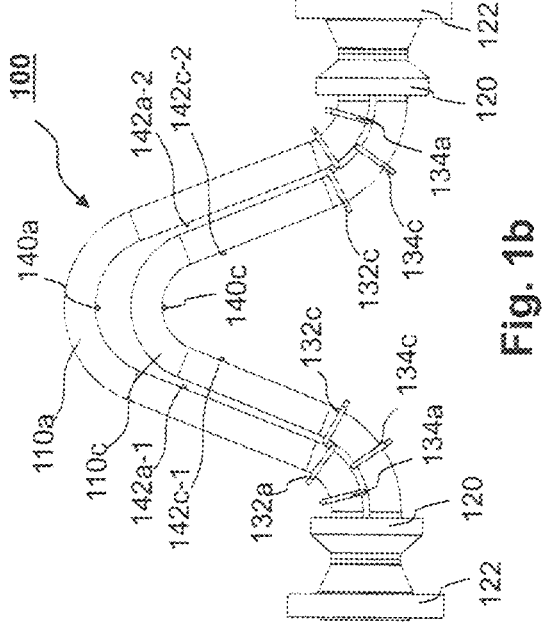
FIG. 1b shows a schematic side view of the first exemplary embodiment of a mass flow meter according to the present disclosure without a support tube.
Figure 1D:
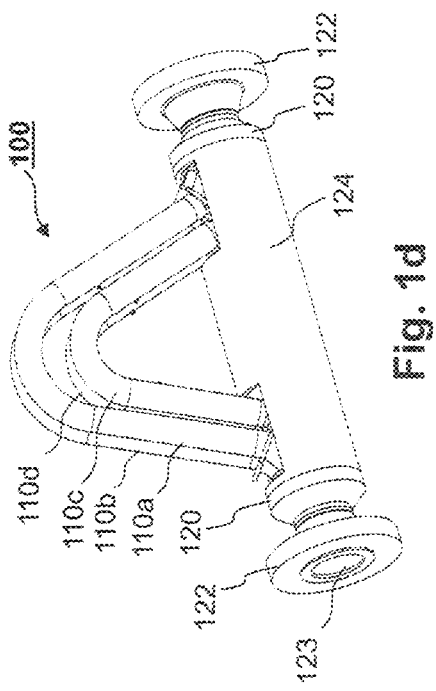
FIG. 1d shows a spatial depiction of the first exemplary embodiment of a mass flow meter according to the present disclosure with a mounted support tube.
Figure 1A:
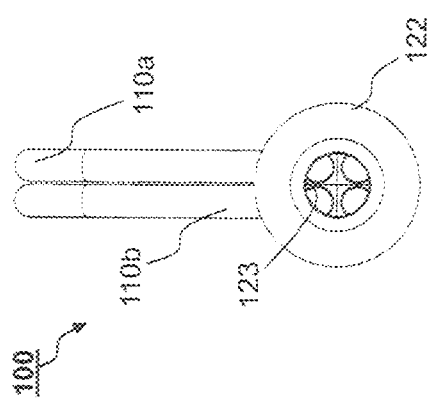
FIG. 1a shows a schematic front view of a first exemplary embodiment of a mass flow meter according to the present disclosure.
Figure 1C:
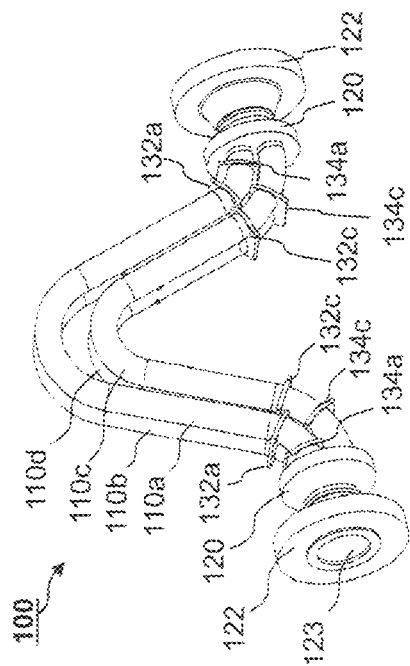
FIG. 1c shows a spatial depiction of the first exemplary embodiment of a mass flow meter according to the present disclosure without a support tube.

The exemplary embodiment depicted in FIGS. 1a to 1d of a mass flow meter 100 according to the invention comprises four curved measuring tubes 110a, 110b, 110c, 110d. The measuring tubes 110a, 110b, 110c, 110d extend between an inlet-side collector 120 and an outlet-side collector 120 and are firmly connected to them, for example by rolling, brazing or welding. A solid support tube 124 firmly connected to both collectors extends between the collectors 120, thereby rigidly coupling the collectors 120 with one another. The support tube 124 has openings on its upper side through which the measuring tubes 110a, 110b, 110c, 110d are guided from the collectors 120 out of the support tube 124 and back.

Each of the collectors 120 has a flange 122 at its end, by means of which the mass flow meter is to be installed in a tube line. A mass flow through the mass flow meter 100, in particular its measuring tubes 110a, 110b, 110c, 110d, is to be guided through central openings 123 in the flanges 122, in order to measure the mass flow.

A first measuring tube 110a and a second measuring tube 110b are each connected to two nodal plates 132a, 134a on the inlet side and the outlet side, wherein the position of the two inner nodal plates 132a, i.e. those which are located on the inlet side or outlet side respectively furthest away from the corresponding collector 120, defines a free vibration length of a first measuring tube pair formed by the first measuring tube 110a and the second measuring tube 110b. This free vibration length has a decisive influence on a bending vibration excitation mode of the first measuring tube pair, in particular on its excitation mode natural frequency with which the first measuring tube pair is to be excited. Similarly, a third measuring tube 110c and a fourth measuring tube 110d are each connected to two nodal plates 132c, 134c on the inlet side and on the outlet side, wherein the position of the two inner nodal plates 132c defines a free vibration length of a second measuring tube pair formed by the third measuring tube 110c and the fourth measuring tube 110d, which vibration length, in turn influences in particular the excitation mode natural frequency with which the second measuring tube pair, is to be excited. Further nodal plates 134a, 134c, which are each arranged between the inner nodal plates 132a, 132c and the collectors 120, serves the purpose of defining further vibration nodes, in order to reduce the mechanical maximum stresses on the oscillating measuring tubes on the one hand, and to minimize the exchange of vibration energy between the mass flow meter and the tube line on the other hand. The free vibration length of the measuring tubes 110a, 110b of the first measuring tube pair is much greater than the free vibration length of the measuring tubes 110c, 110d of the second measuring tube pair, wherein the measuring tubes 110a, 110b of the first measuring tube pair are guided in a higher arc than the measuring tubes 110c, 110d of the second measuring tube pair. In the depicted mass flow meter, which has measuring tubes with an outer diameter of 3 inches, i.e., approximately 76 mm, and a wall thickness of 3.6 mm, the measuring tube pairs have a excitation mode natural frequency of approximately 110 Hz and 160 Hz when the measuring tubes are filled with a medium having a density of water.

To excite the bending vibration excitation modes of the measuring tube pairs, a first exciter arrangement 140a is provided between the first measuring tube 110a and the second measuring tube 110b, and a second exciter arrangement 140c is provided between the third measuring tube 110c and the fourth measuring tube 110d, for example an inductive exciter arrangement in each case comprising a plunger coil on one measuring tube and a plunger body on the opposite measuring tube of the measuring tube pair.

In order to detect the vibrations of the measuring tube pairs, a first sensor arrangement 142a-1, 142c-1 and a second sensor arrangement 142a-2, 142c-2, each having an inlet-side and an outlet-side vibration sensor, are provided in each case in the longitudinal direction symmetrically to the exciter arrangements 140a, 140c, which sensor arrangements are each configured as an inductive arrangement having a plunger coil on one measuring tube and a plunger body on the other measuring tube. Details are known to the person skilled in the art, and need not be explained here. For the sake of clarity, the positions of the exciter arrangement and the sensor arrangements were depicted and provided with reference signs only in FIG. 1b.

The measuring tube pairs are each to be excited at their current excitation mode natural frequency, wherein, for this purpose, the exciter arrangements 140a, 140c of the two measuring tube pairs are connected in series to the operation and evaluation circuit 160 via an exciter conductor loop 140, as schematically depicted in FIG. 1e, such that the exciter arrangements can be supplied with a superimposed signal of the excitation mode natural frequencies of both measuring tube pairs.

The two inlet-side vibration sensors 142a-1 and 142c-1 are connected in series via an inlet-side sensor conductor loop 142-1 and the two outlet-side vibration sensors 142a-2 and 142c-2 via an outlet-side sensor conductor loop 142-2.

The two sensor conductor loops 142-1, 142-2 are connected to the operation and evaluation circuit 160, which is designed to drive the exciter conductor loop 140 and to detect and evaluate the signals of the two sensor conductor loops 142-1, 142-2.

Due to the high quality of the measuring tube pairs, the resonant vibrations at the respective excitation mode natural frequency have an amplitude that is many times greater than the forced vibrations out of resonance at the excitation mode natural frequency of the respective other measuring tube pair. Nevertheless, the forced vibrations out of resonance can cause a zero-point error if the sensor signals of the two measuring tube pairs have different signal amplitude differences between the signals of the inlet-side and outlet-side vibration sensors due to manufacturing tolerances.

Figure 2A:
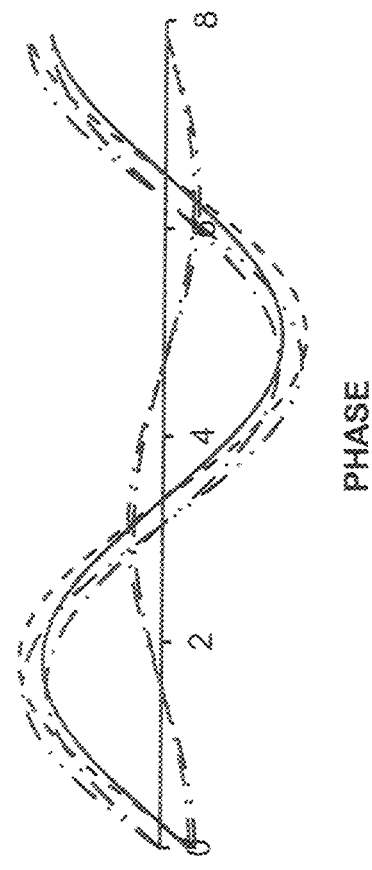
FIG. 2a shows a waveform of vibration sensor signals at equal amplitude ratios for both measuring tube pairs.
Figure 2B:
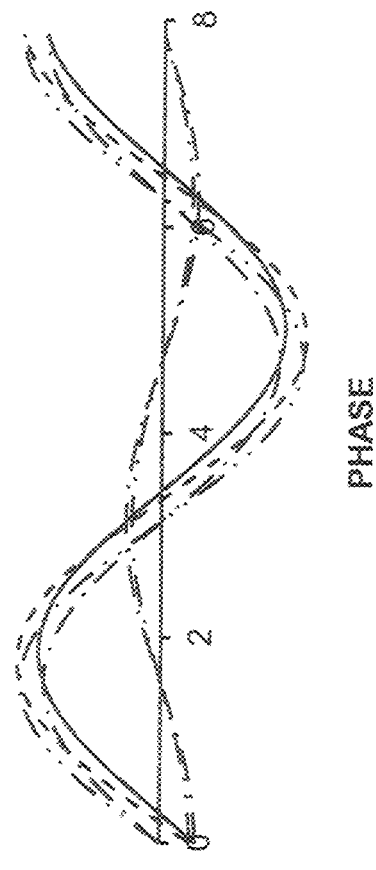
FIG. 2b shows a waveform of vibration sensor signals at different amplitude ratios for the two measuring tube pairs.

The resonant vibrations have their maximum amplitude at a phase angle of $\pi/2$ between the exciter signal and the deflection. In contrast, the forced vibrations out of resonance have a phase angle of 0 or $\pi$ between the exciter signal and the deflection. The superimposed vibration of a measuring tube pair at the excitation mode natural frequency of the other measuring tube pair therefore has a phase shift of $\pm\pi/2$ relative to its resonant vibration. Since the signals of the vibration sensors of both measuring tube pairs are detected via common sensor loops, at the excitation mode natural frequency of a measuring tube pair the signals of the vibration sensors of this resonantly vibrating measuring tube pair are superimposed on the signals of the vibration sensors of the forced vibrations of the other measuring tube pair, wherein the latter are shifted by $\pm\pi/2$ relative to the former. To explain the situation, corresponding waveforms are depicted in FIGS. 2a and 2b for a flow of zero, wherein both measuring tube pairs are excited only with the excitation mode natural frequency of one measuring tube pair for simplification. The singly dotted lines each show the isolated waveform of the inlet-side vibration sensors. The double-dotted lines each show an isolated waveform of the outlet-side vibration sensors. The solid lines show the superimposed waveform of the inlet-side vibration sensors, which is actually detected via inlet-side sensor loop. The dashed lines show the superimposed waveform of the outlet-side vibration sensors, which is actually detected via outlet-side sensor loop.

FIG. 2a shows different signal amplitudes for the inlet-side and outlet-side vibration sensors, wherein the ratio of the signal amplitude of an inlet-side sensor and the signal amplitude of the associated outlet-side sensor are the same for both measuring tube pairs. In this case, they do not affect the phase relationship between the superimposed inlet-side and outlet-side signals. These have simultaneous zero crossings at a flow of zero.

If, in contrast, as depicted in FIG. 2b, the ratio of the signal amplitude of an inlet-side sensor and the signal amplitude of the associated outlet-side sensor of the one measuring tube pair deviates from that of the other, this leads to a phase difference between the superimposed inlet-side and outlet-side signals, which, corresponding to the measuring principle, causes a zero-point error if no further measures are taken.

In the mass flow meter according to the invention, an adjustment of the signal amplitude differences by trimming the sensitivity of a vibration sensor takes place, such that the amount of the difference deviation $D=|delta_1-delta_2|$ of the second relative signal amplitude difference from the first relative signal amplitude difference $delta_1$ is not more than a tolerance value $D_T$, i.e. $D \leq D_T$, wherein $D_T<2\%$, in particular $D_T<1\%$, applies.

In this way, the state in FIG. 2a is approximated in which the zero-point error is eliminated, although each of the measuring tube pairs has a non-vanishing relative signal amplitude difference.

A constructive approach which enables the signal amplitude differences to be adapted is now described with reference to FIGS. 3a to 3d, which depict components of a vibration sensor 142 of an exemplary embodiment of a mass flow meter according to the invention. The four vibration sensors 142a-1, 142c-1, 142a-2, 142c-2 of a measuring sensor have essentially the same structure as is described here in summary with reference sign 142.

The vibration sensor 142 has a magnetic part 170 and a plunger coil part 180, wherein the magnetic part 170 and the coil part 180 have a magnet holder 171 and coil holder 181 respectively, each of which is joined at its base to a measuring tube 110a, 110b, in particular by welding or brazing. The coil holder 181 has a coil holder receiving fork 182 on its upper side remote from the base. The coil part 180 further comprises an essentially cylindrical plunger coil body 183 on which a cylindrical plunger coil is included, which comprises a plunger opening on a front side remote from the coil holder 181 into which a cylindrical rod magnet 173 of the magnetic part 170 can be at least partially inserted. Two contact pins 187, 188 protrude from the coil body, via which contact pins 187, 188 the coil is to be contacted and connected to a sensor loop. On a front side remote from the plunger opening of the coil, the coil body 183 has a threaded bolt 184, which is inserted into the coil holder receiving fork 182 and fixed by means of a nut 185, wherein an elastic clamping sleeve 186 encompassing the threaded bolt is axially clamped between the nut 185 and the coil holder 181. The threaded bolt 184 has lateral play in the coil holder receiving fork 182, such that it can be shifted, to the extent of the play, in the Z direction, i.e. parallel to the measuring tube axis, and/or in the Y direction, i.e. in the radial direction of the measuring tube. The magnet holder 171 has essentially the same structure as the coil holder 181. It thus has a magnet holder receiving fork 172, in which a threaded bolt is inserted and fixed to the magnet holder with a nut 174. The threaded bolt carries the cylindrical rod magnet 173 on its end section facing the coil part. Furthermore, the threaded bolt carries a shroud sleeve 175, which surrounds the coil body 183 at least in sections, in order to suppress the influence of external fields on the vibration sensor 142. The threaded bolt has lateral play in the magnet holder receiving fork 172, such that it can be shifted, to the extent of the play, in the Z direction, i.e. parallel to the measuring tube axis, and/or in the Y direction, i.e. in the radial direction of the measuring tube. With the described degrees of freedom, on the one hand, the degree to which the rod magnet 173 and the coil body 183 are coaxially aligned with one another can be set by laterally shifting one or both threaded bolts in the magnet holder receiving fork 172 and/or the coil holder receiving fork 182 respectively. Furthermore, by laterally displacing both threaded bolts in parallel, the position of the vibration sensor relative to the measuring tube can vary in its longitudinal direction or in its radial direction. Each of such shifts is suitable for varying the sensor signal amplitude of a vibration sensor.

FIG. 3e shows an alternative for the design of a magnetic part 170' of a vibration sensor 142. In this case, a magnet holder 171' has a threaded bore 179 into which a threaded bolt 177 carrying the rod magnet 173 is screwed and secured with a counter nut 174. The threaded bolt 177 carries the shroud sleeve 175 as previously described. By rotating the threaded bolt 177, the distance of the rod magnet 173 from the coil body 183 can now be set in a controlled manner. The coil part 170' cannot contribute to a variation in the degree of coaxial alignment of the rod magnet 173 and the coil body 183. For this purpose, the above-described lateral shift of the threaded bolt 184, which carries the coil body 183, is required. A shift of the entire vibration sensor 142 in the direction of the longitudinal axis of the measuring tube or in the radial direction of the measuring tube is not possible with the magnetic part 170'. Of course, the structures of the coil holder and the magnet holder can be reversed; i.e., the coil holder has a threaded bore, and the magnet holder is provided with a receiving fork. It is likewise possible for both the magnet holder and the coil holder to be provided with a threaded bore, with which, however, only a control of the distance between the coil part and the magnet part is possible. Finally, one of the components, for example the coil part, can be completely fixed, such that the signal amplitude of a vibration sensor can only be varied by varying the position of the other component, for example the coil part.

Both components of a vibration sensor preferably have the same mass, in order not to impair a mass balance between the measuring tubes.

Figure 4:
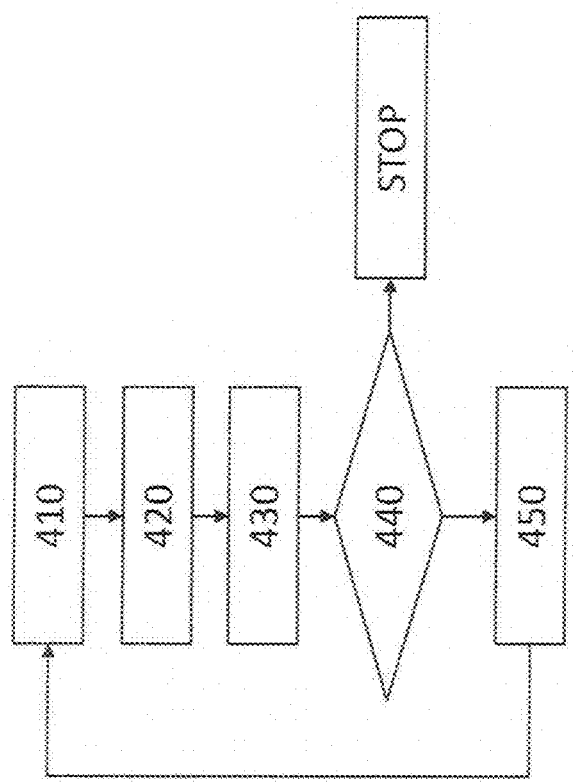
FIG. 4 shows a flow diagram of an exemplary embodiment of the method according to the present disclosure.

As depicted in FIG. 4, an exemplary embodiment of the method according to the invention comprises the following steps:

In a first step 410, the measuring tubes of both measuring tube pairs are simultaneously excited at a first excitation mode natural frequency f1 and at the second excitation mode natural frequency f2, wherein the excitation mode natural frequencies are identified by maximizing the respective sensor signal amplitudes.

In a second step 420, the sensor signal amplitudes of all four vibration sensors are determined, i.e.:

The superimposed sensor signal amplitudes of the inlet-side vibration sensors when the measuring tubes vibrate with the first excitation mode natural frequency f1;

The superimposed sensor signal amplitudes of the outlet-side vibration sensors when the measuring tubes vibrate with the first excitation mode natural frequency f1;

The superimposed sensor signal amplitudes of the inlet-side vibration sensors when the measuring tubes vibrate with the second excitation mode natural frequency f2;

The superimposed sensor signal amplitudes of the outlet-side vibration sensors when the measuring tubes vibrate with the second excitation mode natural frequency f2;

In a third step 430, a first relative signal amplitude difference $delta_1$ is determined between the signals of the inlet-side vibration sensors and the signals of the outlet-side vibration sensors when the measuring tubes vibrate with the first excitation mode natural frequency, and a second relative signal amplitude difference $delta_2$ is determined between the signals of the inlet-side vibration sensors and the signals of the outlet-side vibration sensors when the measuring tubes vibrate with the second excitation mode natural frequency. For this purpose, in each case twice the difference is divided by the sum of the signals.

The superimposed signal amplitudes at the first excitation mode natural frequency and the first relative signal amplitude difference $delta_1$ are respectively assigned to the sensors of the first measuring tube pair. The signal amplitudes at the second excitation mode natural frequency and the second relative signal amplitude difference $delta_2$ are assigned to the sensors of the second measuring tube pair.

In a fourth step 440, there is a check of whether a difference deviation $D=|delta_1-delta_2|$ between the first signal amplitude difference from the second signal amplitude difference exceeds a tolerance value.

If this is not the case, the method is ended.

If this is the case, in a fifth step 450 the signal amplitude differences are adjusted by trimming the sensitivity of at least one vibration sensor.

The trimming can be effected by varying the position of a component of a vibration sensor, for example by the degree of coaxiality between the coil body and the rod magnet of a vibration sensor and/or by changing the distance between such components. Furthermore, both components of a vibration sensor can be shifted together parallel to the measuring tube axis or perpendicularly thereto, in order to vary the vibration amplitude of the sensor, which in turn affects the sensor signal amplitude.

After trimming a vibration sensor, the method is repeated, in order to check whether the difference deviation is within the tolerance range.

For trimming, for example, the vibration sensor can be selected, whose signal amplitude deviates most from the signal amplitude of the other vibration sensors, or the sensor with the smallest signal amplitude can be selected.

The invention claimed is:

1. A mass flow meter structured to operate according to the Coriolis principle to determine a mass flow measurement value of a medium flowing through the mass flow meter, comprising:

a first measuring tube pair including two measuring tubes mounted as to oscillate relative to one another and to have a bending vibration excitation mode that has a media-dependent first excitation mode natural frequency;

an electrodynamic first exciter configured to excite bending vibrations between the measuring tubes of the first measuring tube pair;

a first vibration sensor pair including a first inlet-side vibration sensor and a first outlet-side vibration sensor, each configured to detect bending vibrations at a different position on the first measuring tube pair;

a second measuring tube pair including two measuring tubes mounted as to oscillate relative to one another and to have a bending vibration excitation mode that has a media-dependent second excitation mode natural frequency, the second excitation mode natural frequency different than the first excitation mode natural frequency;

an electrodynamic second exciter configured to excite bending vibrations between the measuring tubes of the second measuring tube pair;

a second vibration sensor pair including a second inlet-side vibration sensor and a second outlet-side vibration sensor, each configured to detect bending vibrations at a different position on the second measuring tube pair; and an electronic circuit configured to drive the first and second exciters with a common exciter signal and detect sensor signals from the first and second vibration sensor pairs, to detect flow-dependent phase differences between the sensor signals of the inlet-side and outlet-side vibration sensors of one of the first and second vibration sensor pairs, and to determine mass flow measurement values based on the flow-dependent phase differences, wherein:

the exciter signal excites the bending vibration excitation modes of both the first measuring tube pair and the second measuring tube pair;

an exciter signal path is configured to transmit the exciter signal to the first and second exciters;

an inlet-side sensor signal path is configured to transmit sensor signals of the first and second inlet-side vibration sensor in a superimposed manner;

an outlet-side sensor signal path is configured to transmit sensor signals of the first and second outlet-side vibration sensor in a superimposed manner;

the sensor signals have a first relative signal amplitude difference between the sensor signals of the inlet-side sensors and the sensor signals of the outlet-side sensors in response to vibrations at the first excitation mode natural frequency;

the sensor signals have a second relative signal amplitude difference between the sensor signals of the inlet-side sensors and the sensor signals of the outlet-side sensors in response to vibrations at the second excitation mode natural frequency; and at least one of the vibration sensors of the first and second vibration sensor pairs is adapted such that a difference deviation of the second relative signal amplitude difference from the first relative signal amplitude difference is not more than a threshold value of 2%.

2. The mass flow meter of claim 1, wherein the first relative signal amplitude difference and the second relative signal amplitude difference at the respective excitation mode natural frequency is defined as:

$$delta_i = \frac{2 \cdot (A_{in,i} - A_{out,i})}{A_{in,i} + A_{out,i}},$$

wherein i indicates the first and second measuring tube pairs, respectively.

3. The mass flow meter of claim 1, wherein the threshold value of the difference deviation is not more than 0.5%.

4. The mass flow meter of claim 1, wherein the threshold value of the difference deviation is not more than 0.1%.

5. The mass flow meter of claim 1, wherein an absolute amount of the difference deviation divided by a sum of absolute amounts of the first and second relative signal amplitude differences is not more than 0.5.

6. The mass flow meter of claim 1, wherein an absolute amount of the difference deviation divided by a sum of absolute amounts of the first and second relative signal amplitude differences is not more than 0.2.

7. A method for zero-point adjustment of a mass flow meter structured to operate according to the Coriolis principle to determine a mass flow measurement value of a medium flowing through the mass flow meter, which mass flow meter comprises:

a first measuring tube pair including two measuring tubes mounted as to oscillate relative to one another and to have a bending vibration excitation mode that has a media-dependent first excitation mode natural frequency;

an electrodynamic first exciter configured to excite bending vibrations between the measuring tubes of the first measuring tube pair;

a first vibration sensor pair including a first inlet-side vibration sensor and a first outlet-side vibration sensor, each configured to detect bending vibrations at a different position along the first measuring tube pair;

a second measuring tube pair including two measuring tubes mounted as to oscillate relative to one another and to have a bending vibration excitation mode that has a media-dependent second excitation mode natural frequency, the second excitation mode natural frequency different than the first excitation mode natural frequency;

an electrodynamic second exciter configured to excite bending vibrations between the measuring tubes of the second measuring tube pair;

a second vibration sensor pair including a second inlet-side vibration sensor and a second outlet-side vibration sensor, each configured to detect bending vibrations at a different position along the second measuring tube pair; and an electronic circuit configured to drive the first and second exciters with a common exciter signal and detect sensor signals from the first and second vibration sensor pairs, to detect flow-dependent phase differences between the sensor signals of the inlet-side and outlet-side vibration sensors of one of the first and second vibration sensor pairs, and to determine mass flow measurement values based on the flow-dependent phase differences, wherein:

the exciter signal excites the bending vibration excitation modes of both the first measuring tube pair and the second measuring tube pair;

an exciter signal path is configured to transmit the exciter signal to the first and second exciters;

an inlet-side sensor signal path is configured to transmit sensor signals of the first and second inlet-side vibration sensor in a superimposed manner;

an outlet-side sensor signal path is configured to transmit sensor signals of the first and second outlet-side vibration sensor in a superimposed manner, the method comprising:

determining sensor signal amplitudes of the inlet-side vibration sensors when the measuring tubes vibrate at the first excitation mode natural frequency;

determining sensor signal amplitudes of the outlet-side vibration sensors when the measuring tubes vibrate with the first excitation mode natural frequency;

determining sensor signal amplitudes of the inlet-side vibration sensors when the measuring tubes vibrate with the second excitation mode natural frequency;

determining sensor signal amplitudes of the outlet-side vibration sensors when the measuring tubes vibrate with the second excitation mode natural frequency;

determining a first relative signal amplitude difference between the sensor signals of the inlet-side vibration sensors and the sensor signals of the outlet-side vibration sensors when the measuring tubes vibrate at the first excitation mode natural frequency;

determining a second relative signal amplitude difference between the sensor signals of the inlet-side vibration sensors and the sensor signals of the outlet-side vibration sensors when the measuring tubes vibrate at the second excitation mode natural frequency;

comparing the first relative signal amplitude difference with the second relative signal amplitude difference; and adjusting the zero-point of the mass flow meter by adjusting the first and/or second relative signal amplitude differences by trimming a sensitivity of at least one vibration sensor of the first and second vibration sensor pairs such that a difference deviation between the first signal amplitude difference and the second signal amplitude difference is not more than a tolerance value of 2%.

8. The method of claim 7, wherein the tolerance value of the difference deviation is not more than 0.5%.

9. The method of claim 7, wherein the tolerance value of the difference deviation is not more than 0.1%.

10. The method of claim 7, wherein the difference deviation divided by the sum of the first and second relative signal amplitude differences is not more than 0.5.

11. The method of claim 7, wherein the difference deviation divided by the sum of the first and second relative signal amplitude differences is not more than 0.2.

12. The method of claim 7, wherein trimming the sensitivity of the at least one vibration sensor includes varying a relative position between a magnet and a coil of the at least one vibration sensor.

13. The method of claim 7, wherein trimming the sensitivity of the at least one vibration sensor includes varying a rest position distance between a magnet and a coil of the at least one vibration sensor.

14. The method of claim 7, wherein trimming the sensitivity of the at least one vibration sensor includes varying a degree of coaxial alignment between a magnet and a coil of the at least one vibration sensor.

15. The method of claim 7, wherein trimming the sensitivity of the at least one vibration sensor includes varying a position of the at least one vibration sensor in a direction of a longitudinal axis of the corresponding measuring tube of the corresponding measuring tube pair.

16. The method of claim 7, wherein trimming the sensitivity of the at least one vibration sensor includes varying a position of the at least one vibration sensor perpendicular to a direction of a longitudinal axis of the corresponding measuring tube of the corresponding measuring tube pair.

17. The method of claim 7, wherein trimming the sensitivity of the at least one vibration sensor includes varying an effective number of windings of a coil of the at least one vibration sensor.

18. The method of claim 7, wherein adjusting the first and/or second signal amplitude differences by trimming the sensitivity of precisely one vibration sensor of the first and second vibration sensor pairs is included.

* * * * *